United States Patent [19]

Bergamini

[11] Patent Number: 5,027,654

[45] Date of Patent: Jul. 2, 1991

[54] VOLUMETRIC METER FOR LIQUIDS AND/OR GASES

[75] Inventor: Giorgio Bergamini, Bari, Italy

[73] Assignee: Nuovopignone-Industrie Meccaniche e Fonderia S.p.A.

[21] Appl. No.: 423,054

[22] Filed: Oct. 18, 1989

[30] Foreign Application Priority Data

Oct. 19, 1988 [IT] Italy .................... 22356 A/88

[51] Int. Cl.⁵ .............................................. G01F 3/08
[52] U.S. Cl. ...................................... 73/259; 418/158; 418/225
[58] Field of Search .................. 73/259, 253; 418/2, 418/158, 225

[56] References Cited

U.S. PATENT DOCUMENTS

| | | | |
|---|---|---|---|
| 493,881 | 3/1893 | Westinghouse et al. | 73/259 |
| 2,631,544 | 3/1953 | Wilcox | 418/158 X |
| 2,737,121 | 3/1956 | Badalini | 418/225 |
| 2,911,827 | 11/1959 | Hanks | 73/259 X |
| 4,659,256 | 4/1987 | Bristow | 418/225 X |

FOREIGN PATENT DOCUMENTS 0102119  6/1984  Japan .................................... 73/259

Primary Examiner—Herbert Goldstein
Attorney, Agent, or Firm—Morgan & Finnegan

[57] ABSTRACT

A volumetric meter for liquids and/or gases, in the radial cavities of the rotor of which there are housed rolling rollers which, by undergoing mutual repulsion by the action of magnets embedded in them, are urged radially into a sealed state against the inner surface of the cylindrical chamber, which is provided in positions straddling said opposite maximum and minimum clearance zones with two portions having constant curvatures with their centre on the rotor axis and extending through an angle equal to the angular pitch between two successive rollers, i.e. to 360° divided by the number of rollers used. Further inlet and outlet ports cooperating with the rear space in the housing cavities are also provided, as are fine adjustment means.

10 Claims, 3 Drawing Sheets

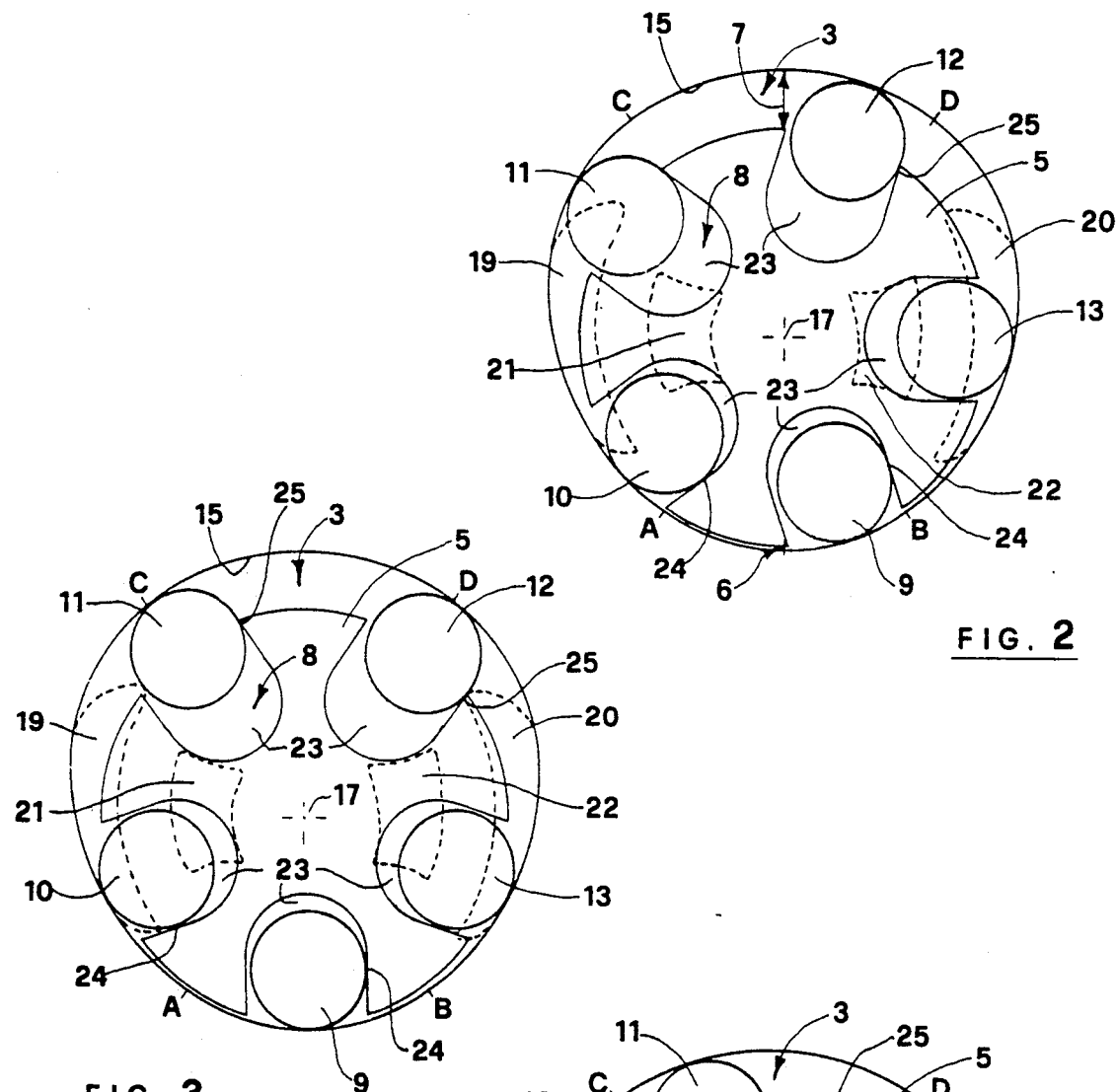
FIG. 2
FIG. 3
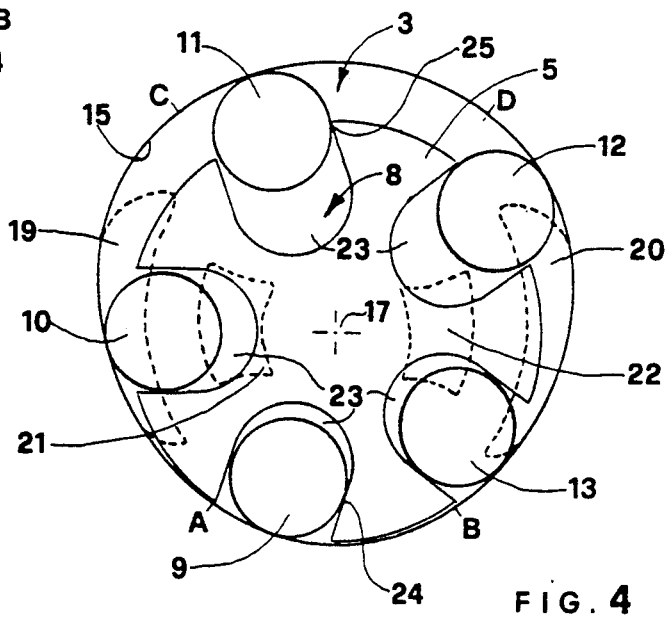
FIG. 4

VOLUMETRIC METER FOR LIQUIDS AND/OR GASES

This invention relates to a volumetric meter for liquids and/or gases which, by minimizing friction, by providing more reliable and uniform adherence of the seal elements which rotate on the inner surface of the outer casing of the meter, and by never allowing any communication between the inlet and outlet ports, allows effective, reliable, and extremely accurate and economical measurement even at very low flow rates and is therefore particularly suitable for application in service stations for the purpose of accurately measuring the delivered fuel.

Vane-type volumetric meters are already known in the state of the art, they consisting substantially of a rotor mounted eccentrically within a cylindrical chamber in the meter outer casing so that a minimum clearance and a maximum clearance are formed between them, said rotor being provided with radial housing cavities for the vanes, which are urged elastically in a radial direction against the inner surface of said cylindrical chamber, which comprises an inlet port and an outlet port positioned symmetrically in the vicinity of said minimum clearance between the rotor and the inner surface of said chamber.

Such meters however suffer from a series of drawbacks the most series of which is due to the high sliding friction which means that lubrication is required, with the result that such meters are practically unusable for gases, their use being limited to the measurement of liquids. Furthermore, such a high friction results in a considerable pressure drop between the upstream and downstream sides of the meter, facilitating seepage of the fluid through the clearances with consequent measurement errors and low resultant accuracy. Again, such seepage becomes more important the smaller the volumetric rate of the flow to be measured, with the result that such meters are totally unsuitable for application in those fields in which high accuracy is required under conditions of considerable variation in the rate of flow, such as in gasoline measurement in service stations.

Finally, the elastic elements which radially urge the vanes to form a seal against the inner surface of said chamber not only induce further friction but mean that a reliably and uniformly lasting seal cannot be guaranteed, consequently further reducing the meter accuracy.

The object of the present invention is to obviate the aforesaid drawbacks by providing a volumetric meter in which minimum friction conditions are attained without the need for lubrication, thus allowing both gases and liquids, even of very low flow rate, to be measured with a considerable accuracy which remains constant with time.

This is attained substantially in that the vanes are replaced by rollers the rolling friction of which is obviously consierably lower than the sliding friction of the vanes, in said rollers there being embedded magnets which all have their magnetization axial and in the same direction, so that the seal between said rollers and the inner surface of the cylindrical chamber of the meter outer casing is now lastingly ensured by the magnetic repulsion effect generated between said rollers, urging them radially against said inner surface.

Besides operational advantages, such a construction also results in considerable cost advantages due to the fact that all the elements of the volumetric meter can now be of plastics instead of the metal construction as is generally the case, and in addition a simple magnetic sensor such as of the Hall effect type is sufficient, in cooperation with the magnets, to directly generate a pulse-form signal proportional to the volumetric flow rate under examination.

Again, in order to nullify the effect of the Coriolis forces which, by inducing within the minimum and maximum clearance zones of the meter a circumferential displacement of the roller from one inner surface to the other of its housing cavity, would result in direct communication between the inlet and outlet ports of the meter with consequent alteration in the meter accuracy, according to the present invention the inner surface of said cylindrical chamber of the meter outer casing is provided, in positions straddling said opposing maximum and minimum clearance zones, with portions having constant curvatures with their centre on the rotor axis and extending through an angle equal approximately to the angular pitch between two successive rollers, i.e. to 360° divided by the number of rollers used.

In this manner the rollers suffer no radial displacement within and over the whole extent of said zones because of the constant curvature, with therefore no Coriolis forces arising.

Again, the extent of said zones ensures that there is always at least one seal roller between the inlet and outlet ports within said zones.

Finally, as the clearances between the rollers and their respective housing cavities have already been minimized to increase the quietness and regularity of operation of the meter and to reduce wear due to impact, according to the present invention further inlet and outlet ports are provided cooperating with the space between the roller and rotor in the housing cavities in order to limit seepage losses through said already minimized clearances and thus optimize operation.

Besides providing high accuracy at any flow rate, the present meter can in a simple and ready manner also be finely adjusted for setting purposes as is required in the case of meters used in fuel pumps. Said setting adjustment is made by micro-displacing the rotor shaft so as to vary said maximum and minimum clearances, said displacement being achieved by locking in different angular positions on the baseplate a pin which eccentrically supports said rotor shaft.

Thus, the volumetric meter for liquids and/or gases, consisting substantially of a rotor mounted eccentrically within a cylindrical chamber in the meter outer casing so as to form between them a minimum clearance and a maximum clearance in opposite zones, said rotor being provided with radial housing cavities for seal elements which are urged in a radial direction against the inner surface of said cylindrical chamber, which comprises an inlet port and an outlet port positioned symmetrically in the vicinity of said minimum clearance, and is characterised according to the present invention in that said seal elements are rolling rollers in which there are embedded magnets which all have their magnetization axial and in the same direction, and cooperate with at least one external magnetic sensor, for example of Hall effect type, said inner surface of the cylindrical chamber of the meter outer casing being provided, in positions straddling said opposite maximum and minimum clearance zones, with two portions having constant curvatures with their centre on the rotor axis and extending through an angle equal approximately to the angular pitch between two successive rollers, ie to 360° divided by the number of rollers used, further inlet and outlet ports being provided cooperating with the space between the roller and rotor in the housing cavities.

According to a further preferred embodiment of the present invention, said volumetric meter for liquids and/or gases is characterised in that said meter outer casing is of ferromagnetic material so as to further improve the seal between the magnetic rollers and the inner surface of the cylindrical chamber of said casing.

According to a further preferred embodiment of the present invention, said outer casing, said rotor and said rolling rollers are of plastics material.

According to a further preferred embodiment of the present invention, the rotor is mechanically connected to a revolution counter.

According to a further preferred embodiment of the present invention, said two portions of said inner surface of the cylindrical chamber of the meter outer casing having constant curvatures with their centre on the rotor axis are joined together by two polycentrics of only two arcs, this resulting in minimum engineering cost.

Finally, according to a further preferred embodiment of the present invention, the rotor shaft is mounted eccentrically on a pin which can be locked in different angular positions on said base plate.

The invention will be more apparent with reference to the accompanying drawings which illustrate a preferred embodiment thereof given by way only of non-limiting example in that technical or constructional modifications can be made thereto but without leaving the scope of the present invention.

Again, although its characteristic of high precision under flow rates varying from a maximum to zero make it particularly suitable for measuring the fuel delivered in service stations and its evident symmetrical structure make it an excellent reversible volumetric meter operating with either liquids or gases, it is apparent that it can also be used as a reversible volumetric metering pump for liquids and/or gases which as a pump still possesses the precision characteristics of the meter, namely by driving its rotor with an external motor, or as a reversible motor-positioner for withdrawing power from the shaft of its rotor or for associating a precise angular rotor position with a control fluid volume, operation being possible either with liquid or with gas.

In said drawings:

FIG. 1 is a plan view of a volumetric meter for liquids and/or gases constructed in accordance with the invention, in which its cover has been removed;

FIGS. 2, 3 and 4 schematically represent successive stages in the operation of the meter of FIG. 1, illustrating the total absence of communication between the inlet and outlet ports during the entire process;

Figure 5:
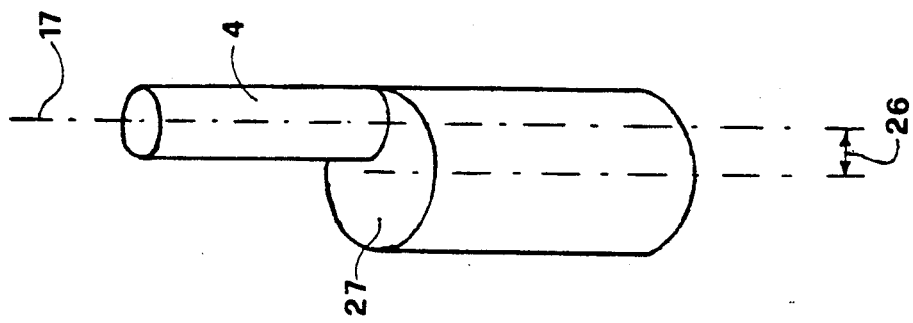
FIG. 5 is a perspective view of a detail of FIG. 1 to an enlarged scale.
Figure 1:
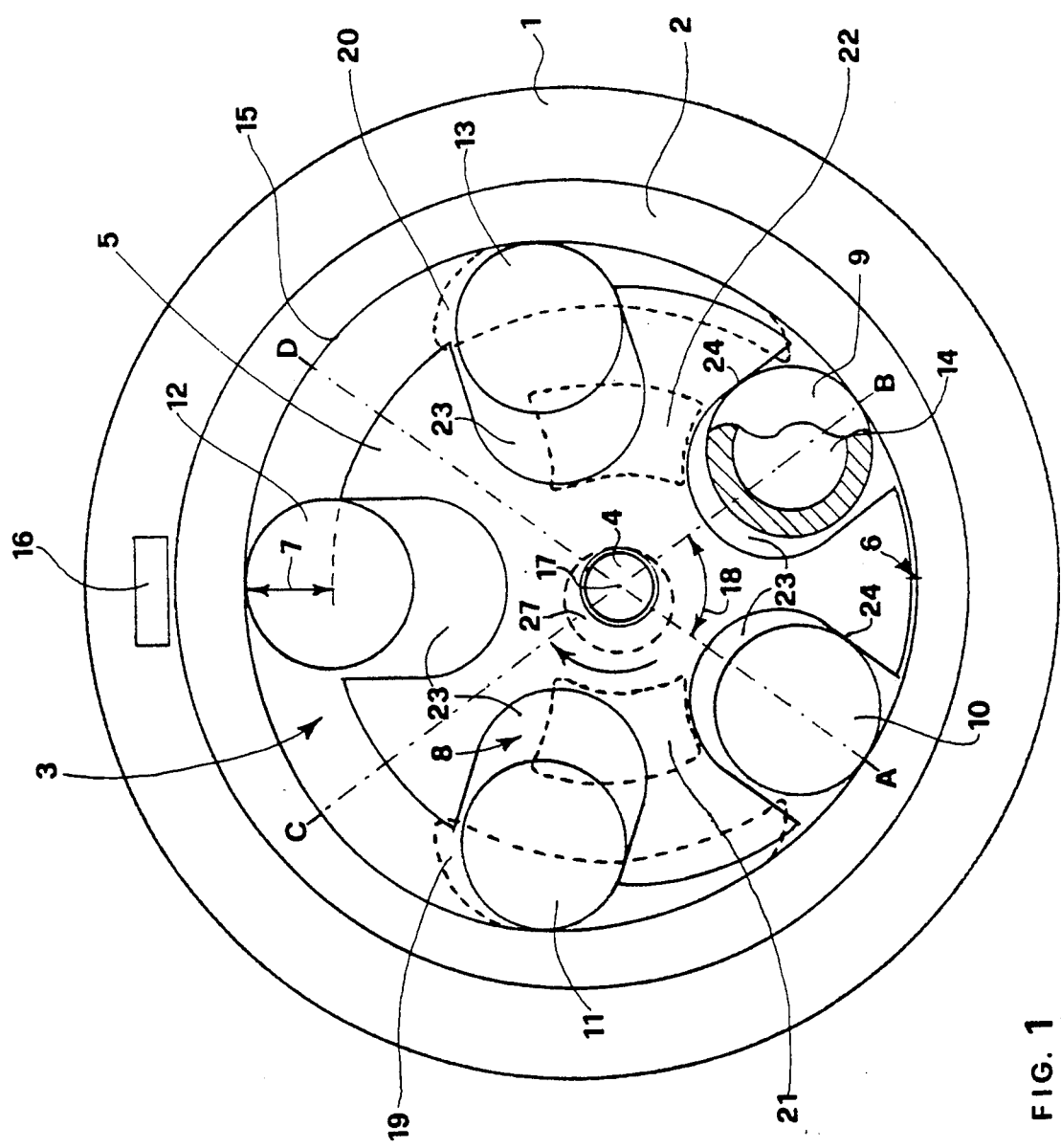

With reference to the figures, 1 indicates the base plate on which there is fixed the meter outer cylindrical casing 2, in the cylindrical chamber 3 of which the rotor 5 is rotatably mounted on the rotation shaft 4 supported by said base plate 1. The rotation shaft 4 for the rotor 5 is in reality supported eccentrically, with eccentricity 26, by an underlying pin 27 which is itself mounted rotatable on said base plate 1, on which it can be locked in different angular positions by suitable means known in the art. In this manner by simply rotating the pin 27 through a certain angle it is possible to displace the rotor axis 17 upwards or downwards, to allow fine setting of the meter. Because said rotor 5 is mounted eccentrically in said chamber 3, two opposite zones are created having a minimum clearance 6 and a maximum clearance 7 respectively. The rotor 5 is provided with radial cavities 8 (five in the figures) which house rolling rotors 9, 10, 11, 12 and 13 respectively, these being each provided with an embedded magnet 14, all the magnets being magnetized axially and in the same direction.

In this manner the magnets 9-13 magnetically repel each other in an axial direction and are thus urged into a sealed state against the inner surface 15 of said cylindrical chamber 3. Said magnets 14 are used together with a magnetic sensor 16, such as of Hall effect type, to generate signals suitable for determining the volumetric flow rate under examination.

Figure 6:
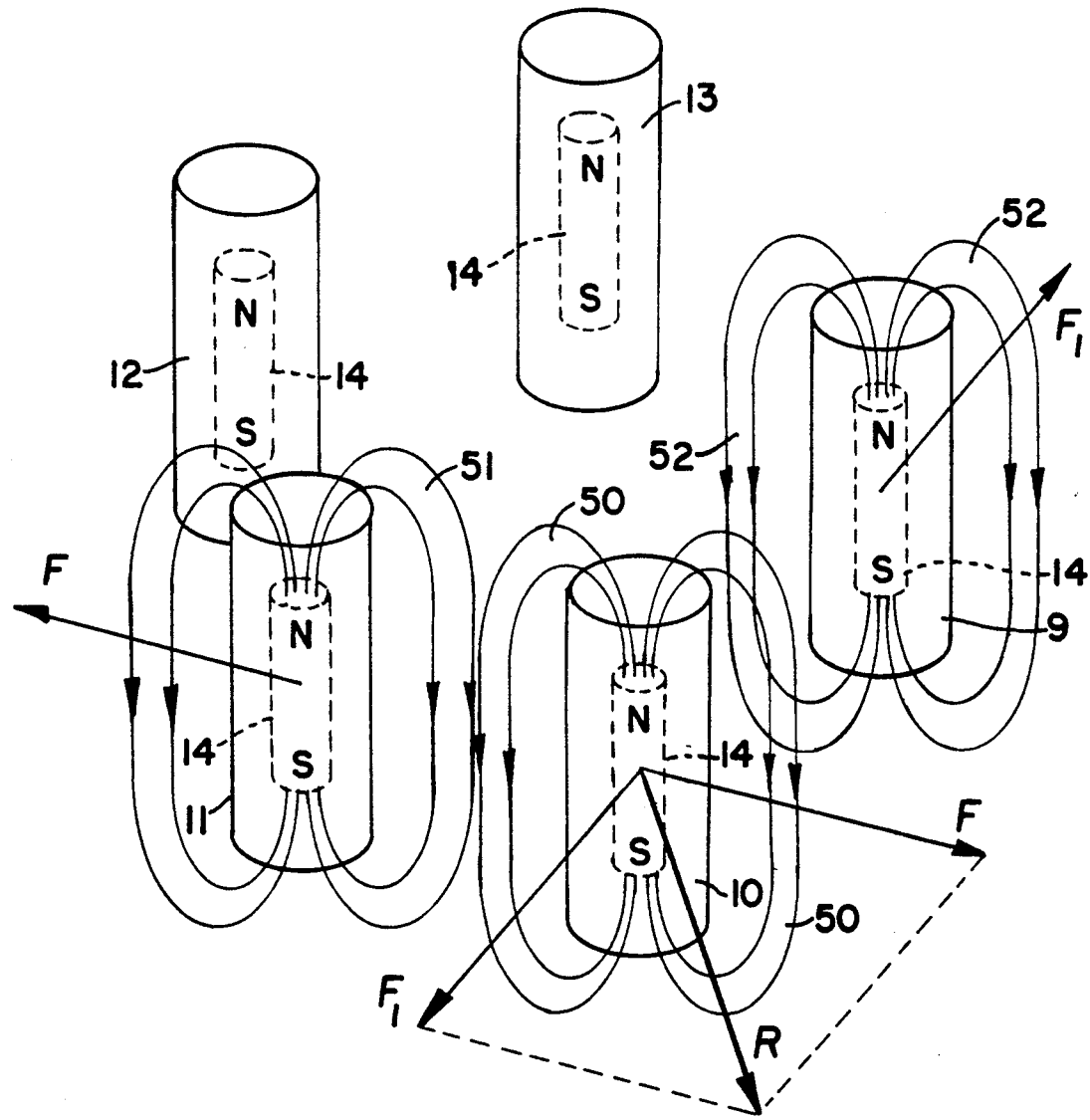
FIG. 6 shows the axially aligned magnets in the rollers.

FIG. 6 shows rollers 9, 10, 11, 12 and 13 each being provided with an embedded magnetic 14. Each magnet 14 has poles marked N and S and the poles of the magnetics 14 are aligned. Magnetic lines of force 50, 51 and 52 are shown from magnets 14 in rollers 9, 10, and 11. By virtue of the magnetic lines of force 50 and 51 rollers 10 and 11 are urged away from one another with a force F. Likewise the interaction between lines of magnetic force 50 of roller 10 and the lines of magnetic force 52 of the roller 9 will push rollers 10 and 9 away from each other with a force $F_1$.

In correspondence with said opposite zones of minimum clearance 6 and maximum clearance 7, said inner surface 15 of the chamber 3 is provided with two portions AB and CD having constant curvatures with their centre on the axis 17 of the rotor 5, and extending through an angle approximately equal to the angular pitch 18 between two successive rollers, such as 9 and 10, and thus equal approximately to 360° divided by the number of rollers used.

In addition to the inlet port 19 and outlet port 20, which are provided in said base plate 1 but could instead be provided in the outer casing 2 itself, there are alos provided a further inlet port 21 and a further outlet port 22 which are arranged to cooperate with the rear spaces 23 in the cavities 8.

From FIGS. 1 to 4 it is apparent that the pairs of rollers, such as 9, 10 and 11, 12, do not undergo circumferential displacement by the effect of Coriolis forces within the respective portions AB and CD but instead remain constantly in contact with the body of the rotor 5 at the same points, ie 24 (see FIG. 1) and 25 (see FIG. 3) respectively, and consequently there is never any direct communication between the inlet ports 19 and 21 and the outlet ports 20 and 22.

I claim:

1. In a volumetric meter for liquids and/or gases, comprising a rotor mounted eccentrically within a cylindrical chamber in a meter outer casing so as to form between them a minimum clearance and a maximum clearance in opposite zones, said rotor being provided with radial housing cavities for seal elements which are urged in a radial direction against the inner surface of said cylindrical chamber, which comprises an inlet port and an outlet port said inlet port and outlet port being positioned symmetrically relative to the axis which conjoins the confronting minimum clearance and maximum clearance in the vicinity of said minimum clearance, the improvement wherein said seal elements are rolling rollers in which there are embedded magnets which all have their magnetization axial and in the same direction, and cooperate with at least one external magnetic sensor, said inner surface of the cylindrical chamber of the meter outer casing being provided, in positions straddling said opposite maximum and minimum clearance zones, with portions having constant curvatures with their center on the rotor axis and extending through an angle equal approximately to the angular pitch between two successive rollers, further inlet and outlet ports being provided cooperating with the space between the roller and rotor in the housing cavities.

2. A volumetric meter for liquids and/or gases as claimed in claim 1, wherein said portions of said inner surface of the cylindrical chamber of the meter outer casing having constant curvatures with their center on the rotor axis are joined together by two polycentrics of only two arcs.

3. A volumetric meter for liquids and/or gases as claimed in claim 1, wherein said outer casing is constructed of ferromagnetic material.

4. A volumetric meter for liquids and/or gases as claimed in claim 1, wherein said outer casing, said rotor and said rolling rollers are constructed of plastics material.

5. A volumetric meter for liquids and/or gases as claimed in claim 1, wherein said rotor is mechanically connected to a revolution counter.

6. A volumetric meter for liquid and/or gases as claimed in claim 1, wherein the rotor shaft is connect to a motor to form a metering pump.

7. A volumetric meter for liquids and/or gases as claimed in claim 1, wherein the meter is fed with pressurized fluid for operation as a motor-positioner.

8. A volumetric meter for liquids and/or gases as claimed in claim 1, wherein the rotor shaft is mounted eccentrically on a pin.

9. A volumetric meter for liquids and/or gases as claimed in claim 1, wherein the external magnetic sensor is of Hall effect type.

10. A volumetric meter for liquids and/or gases a claimed in claim 1, wherein the angle equal to approximately to the angular pitch between successive rollers is 360° divided by the number of rollers used.

* * * * *